(12) United States Patent
Sasaki

(10) Patent No.: US 6,977,812 B2
(45) Date of Patent: Dec. 20, 2005

(54) CONTROL METHOD OF COOLING FAN, AND INFORMATION PROCESSING DEVICE

(75) Inventor: Dai Sasaki, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 359 days.

(21) Appl. No.: 10/421,589

(22) Filed: Apr. 23, 2003

(65) Prior Publication Data

US 2003/0202325 A1 Oct. 30, 2003

Related U.S. Application Data

(62) Division of application No. 10/002,960, filed on Oct. 25, 2001, now Pat. No. 6,587,337.

(30) Foreign Application Priority Data

Oct. 25, 2000 (JP) .......................... 2000-325991

(51) Int. Cl.[7] .............. G06F 1/20; H05K 7/20; G05D 23/00
(52) U.S. Cl. ........................ 361/687; 700/300
(58) Field of Search ............... 361/685, 687, 361/695–697, 724–727; 257/712, 713; 700/299, 300

(56) References Cited

U.S. PATENT DOCUMENTS

| | | | | | |
|---|---|---|---|---|---|
| 5,864,464 A | * | 1/1999 | Lin | ............................. | 361/697 |
| 6,061,237 A | * | 5/2000 | Sands et al. | ................ | 361/695 |
| 6,188,189 B1 | * | 2/2001 | Blake | ......................... | 318/471 |
| 6,340,874 B1 | * | 1/2002 | Vladimir | .................... | 318/471 |
| 6,380,704 B1 | * | 4/2002 | Chin | ......................... | 318/268 |
| 6,512,673 B1 | * | 1/2003 | Wiley | ........................ | 361/695 |
| 6,528,987 B1 | * | 3/2003 | Blake et al. | ................ | 324/168 |

FOREIGN PATENT DOCUMENTS

| | | |
|---|---|---|
| JP | 1-226012 | 9/1989 |
| JP | 3-10308 | 1/1991 |
| JP | 2760933 | 10/1993 |
| JP | 10-320071 | 12/1998 |

* cited by examiner

Primary Examiner—Maria N. Von Buhr
(74) Attorney, Agent, or Firm—Katten Muchin Zavis Rosenman (57) ABSTRACT

A voltage supplied to a cooling fan 305 is adjusted in accordance with a temperature measured near a central processing unit 401. At this time, different tables of temperatures and supplied voltages are referred to depending upon whether or not an external memory device is mounted, whereby suitable control of the cooling fan 305 is performed in accordance with an attaching-detaching state of the external memory device in an information processing device that permits internal mounting of the external memory device.

4 Claims, 8 Drawing Sheets

····· WHEN EXTERNAL MEMORY DEVICE IS MOUNTED
——— WHEN EXTERNAL MEMORY DEVICE IS NOT MOUTED (LIMIT TEMPERATURE)

CONTROL METHOD OF COOLING FAN, AND INFORMATION PROCESSING DEVICE

CROSS-REFERENCE TO RELATED APPLICATION

The present application is a divisional application of and claims priority under 35 U.S.C. §120 from U.S. patent application Ser. No. 10/002,960, which was filed on Oct. 25, 2001 now U.S. Pat. No. 6,587,337 and is hereby incorporated by reference.

TECHNICAL FIELD

The present invention relates to the cooling of an information processing device, and particularly, relates to the control of a cooling fan in the information processing device to which an external memory device, etc. can be detachably attached.

BACKGROUND OF THE INVENTION

A microprocessor such as a central processing unit, etc., arranged in an information processing device generates heat during its operation. A cooling fan is arranged in the information processing device to prevent an operation error due to this heat, an influence of this heat on lifetime, etc.

Since, however, the cooling fan generates noises depending upon a rotation speed, it is desirable to set the rotation speed of the cooling fan to a necessary minimum limit. There is therefore known a technique for arranging a temperature sensor near the central processing unit, and adjusting the rotation speed of the cooling fan on the basis of a temperature near the central processing unit.

In recent years, compactness of the information processing device is advanced, and an external memory device, a memory medium reader, etc., which are conventionally often designed as a built-in fixing type, are designed as an attaching-detaching type for further improving portability, etc. or coping with the diversity of a use mode of a user, etc. In this case, it is considered desirable to permit internal mounting of the "external" memory device, memory medium reader, etc., instead of their external mounting in view of usability at a mounting time, outer appearance, etc.

DISCLOSURE OF THE INVENTION

However, when the "external" memory device of the attaching-detaching type, etc. are internally mountable, the external memory device, etc. themselves constitute new heat sources within the information processing device during the mounting, and are objects to be cooled. Further, it is considered that the paths of cooling air currents are changed depending upon whether they are mounted or not mounted. Therefore, no sufficient cooling effects may possibly be obtained in the cooling fan control similar to that during non-mounting time.

An object of the present invention is to provide an information processing device that permits internal mounting of an "external" memory device, etc., in which suitable control of the cooling fan is performed depending upon an attaching-detaching state of the external memory device, etc.

For overcoming the above problems, the present invention provides a method of controlling a cooling fan in an information processing device that permits internal mounting of a relevant device, comprising the stages of:

obtaining an internal temperature of the information processing device;

obtaining an attaching-detaching state of the relevant device;

obtaining a value relative to a rotation speed of the cooling fan which rotation speed corresponds to the obtained temperature, by referring to data which shows the relationship between the value relative to the rotation speed of the cooling fan and the temperature, and is determined depending upon the attaching-detaching state of the relevant device; and controlling the rotation speed of the cooling fan on the basis of the value relative to the rotation speed of the cooling fan.

The above relevant device refers to an external memory device, a memory medium reader, etc.

The present invention also provides an information processing device that permits internal mounting of a relevant device, comprising:

a cooling fan having variable rotation speeds, temperature obtaining means for obtaining a temperature within the information processing device, attaching-detaching state obtaining means for obtaining an attaching-detaching state of the relevant device, control means for controlling the rotation speed of the cooling fan, and reference data that shows the relationship between a value relative to the rotation speed of the cooling fan and the temperature and is determined depending upon attaching-detaching state of the relevant device, wherein said control means determines the reference data to be referred to, on the basis of the attaching-detaching state of the relevant device obtained by the attaching-detaching state obtaining means, calculates the value relative to the rotation speed of the cooling fan from the temperature obtained by the temperature obtaining means and said reference data, and controls the rotation speed of the cooling fan on the basis of the obtained value.

BEST MODE FOR CARRYING OUT THE INVENTION

An embodiment of the present invention will be explained with regard to a case of application of the present invention to an entertainment apparatus as an information processing device with reference to the drawings. While the present invention is not limited to the entertainment apparatus, the present invention is more effective when applied to a device that is limited in appearance, size, parts to be used, etc. to a certain extent as in the entertainment apparatus for wide popularization thereof.

Figure 1:
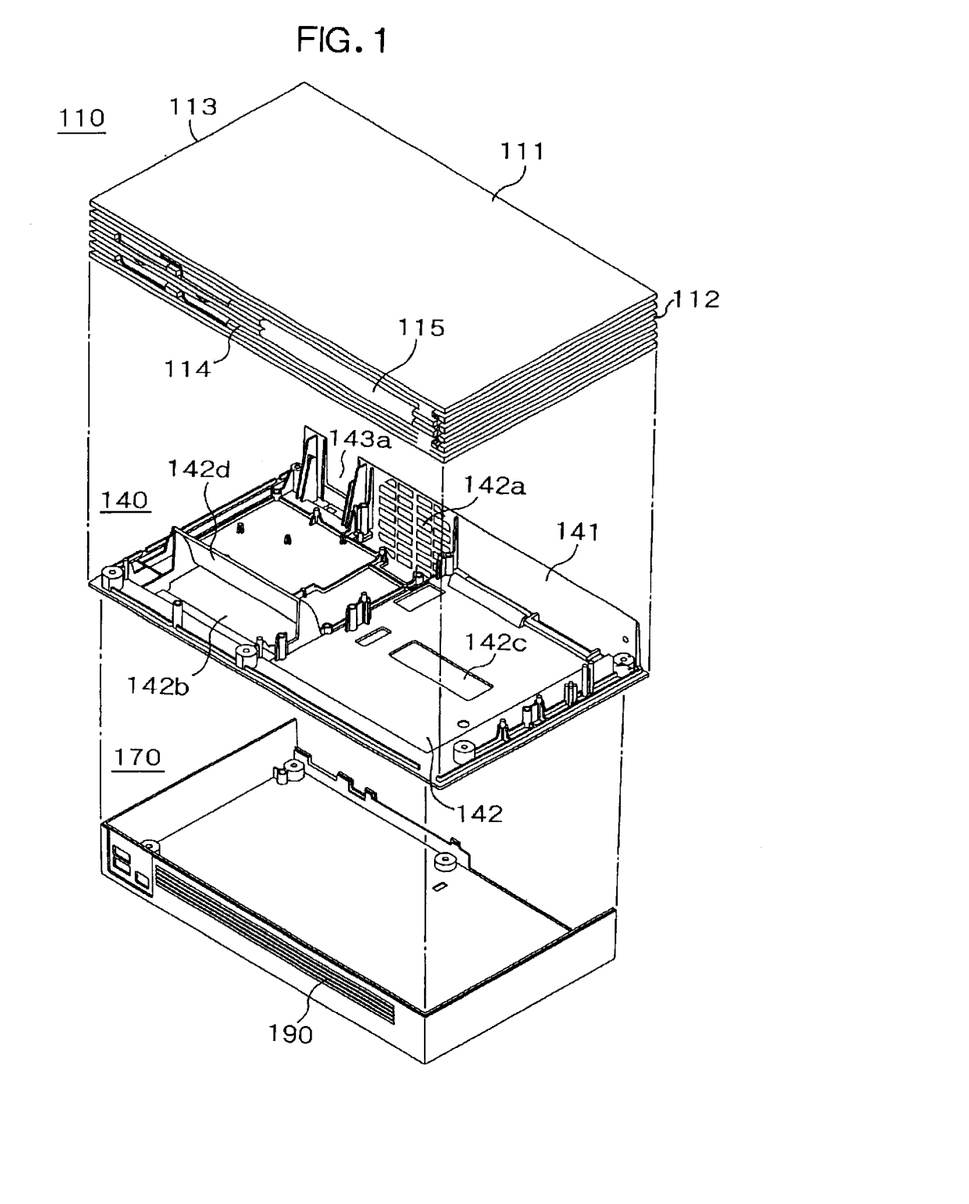
FIG. 1 is an explanatory view showing the shapes of three constructional members of a box body 100 of an entertainment apparatus in one embodiment of the present invention.

A box body 100 of the entertainment apparatus in this embodiment is constituted of three portions as shown in FIG. 1. Namely, the box body 100 is constituted of an upper box body 110, a central chassis 140 and a lower box body 170. Each of the upper box body 110 and the lower box body 170 generally has a flat rectangular parallelepiped shape. The upper box body 110, the central chassis 140 and the lower box body 170 are fixed and integrated with bolts that are not shown.

Figure 2:
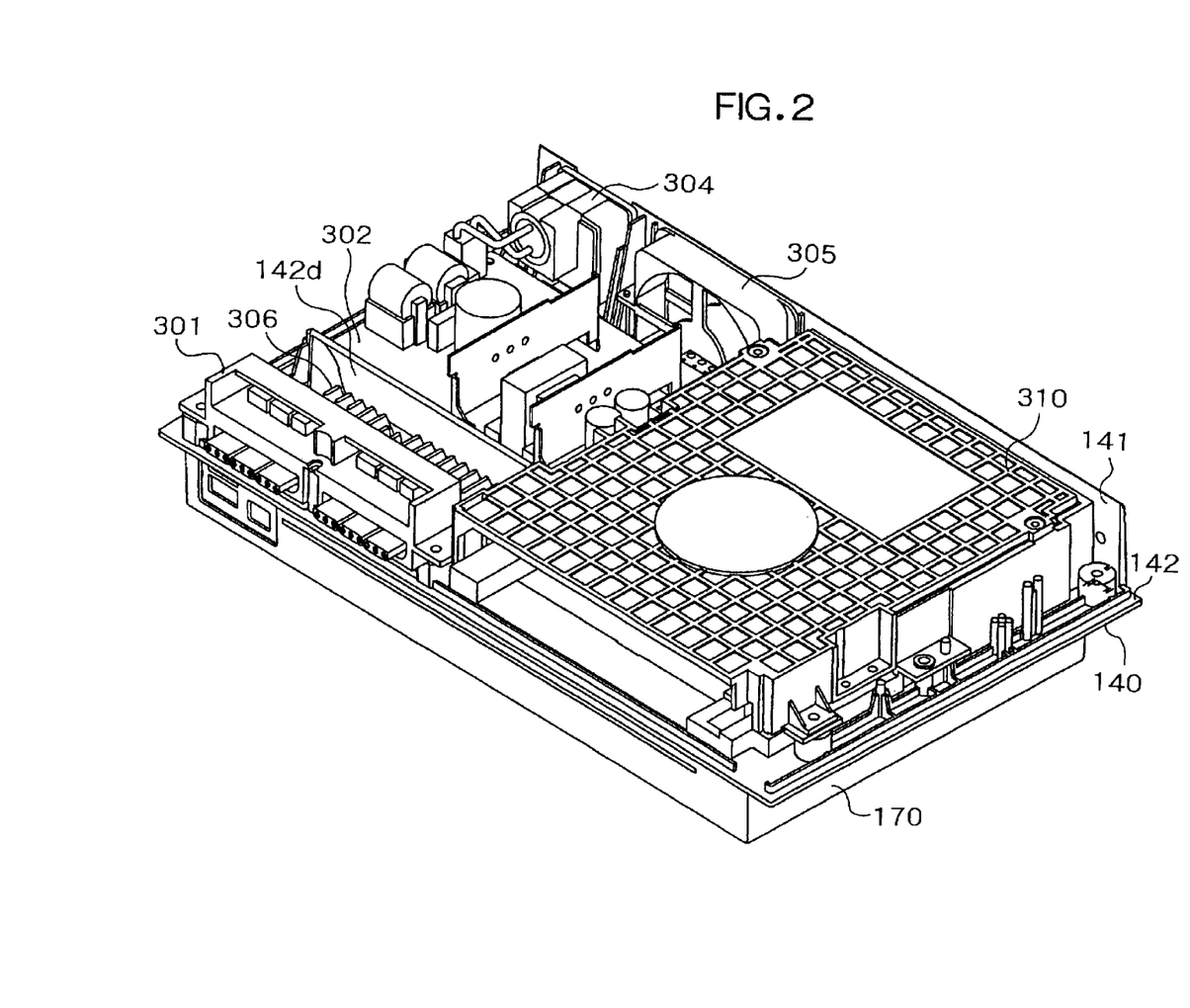
FIG. 2 is a perspective view showing a state in which an upper box body is removed from the box body 100 of the entertainment apparatus in one embodiment of the present invention.

The central chassis 140 has a rear face portion 141 and an intermediate plate 142. This intermediate plate 142 partitions a space within the box body 100 into a storing space on the upper box body 110 side and a storing space on the lower box body 170 side. This intermediate plate 142 has, mounted thereon, various kinds of devices stored into the upper box body 110. Examples of the devices mounted on the intermediate plate 142 include a disk unit 310, a slot unit 301, a power unit 302 and a switch-inlet unit 304 as shown in FIG. 2. A through hole 142b and a through hole 142c are also made in the intermediate plate 142 (see FIG. 1). A hood 142d is arranged in the intermediate plate 142 so as to cover the through hole 142b. A radiation fin 306 (see FIG. 2) arranged in the lower box body 170 extends through the through hole 142b, and is stored into the hood 142d. A notch portion 142a is formed in the intermediate plate 142 and a cooling fan 305 is arranged in the intermediate plate 142. The slot unit 301 is fastened to a projection arranged on an upper face of the intermediate plate 142 with a screw so that the slot unit 301 is fixed to the intermediate plate 142.

The disk unit 310 is a recording medium drive unit for reproducing a disk type recording medium such as CD, DVD, etc., and has a tray (not shown) capable of sliding in and out. The disk type recording medium is to be mounted on the tray. A reproduction portion for storing the tray to reproduce the disk such as CD, DVD, etc. mounted on the tray is built in the disk unit 310.

Figure 3:
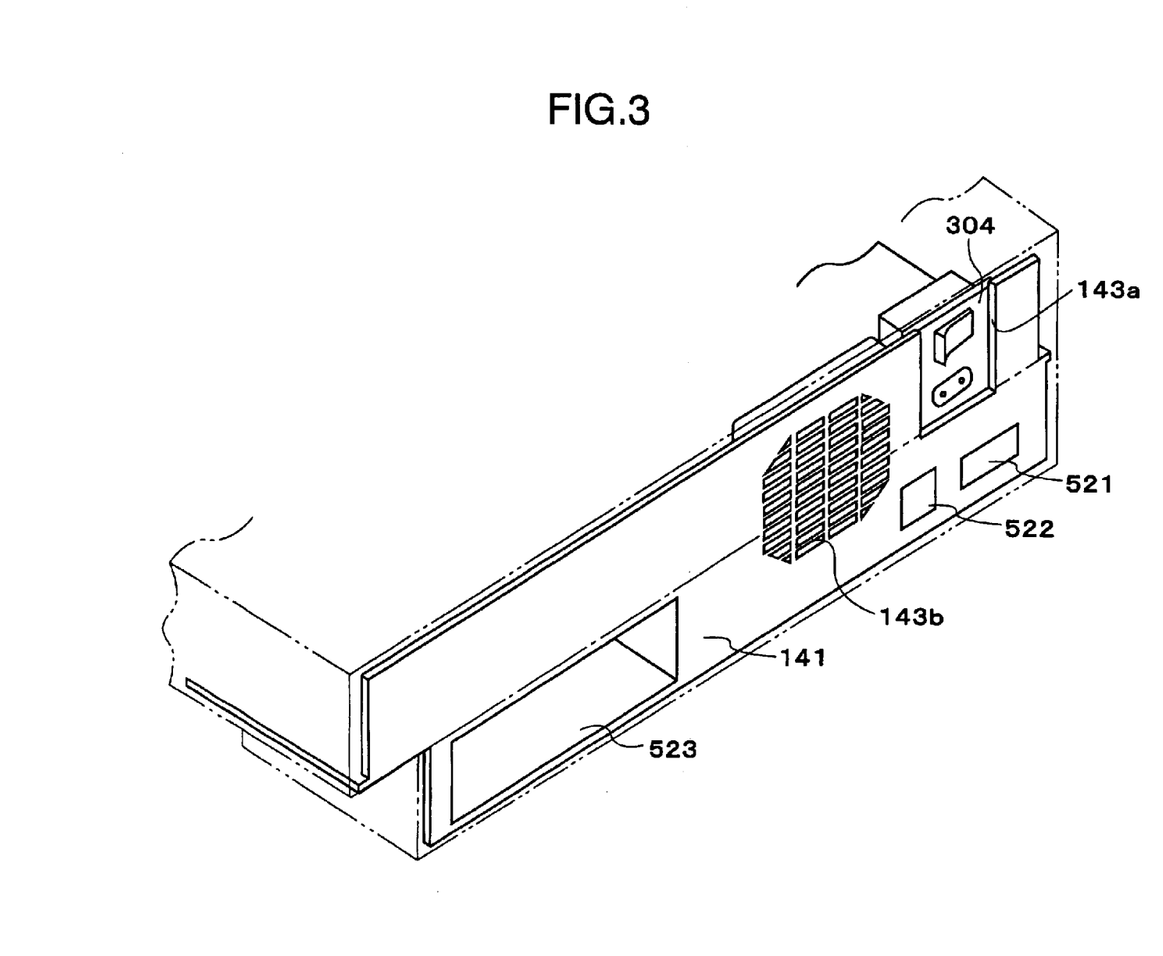
FIG. 3 is a perspective view showing a rear face of the box body 100 of the entertainment apparatus in one embodiment of the present invention.

As shown in FIG. 3, a notch portion 143a is formed in the rear face portion 141 of the central chassis 140. The switch-inlet unit 304 is exposed from the notch portion 143a to the exterior. An exhaust port 143b is formed in a position where the rear face portion 141 faces the cooling fan 305. In addition thereto, as shown in FIG. 3, various kinds of communication terminals 521, 522 are arranged in a lower rear face member 144. An opening portion 523 as an insertion port of an external memory device of an attaching-detaching type is made in the rear face portion 141. In a normal using state, the opening portion 523 is covered with a cover that is not shown.

Figure 4:
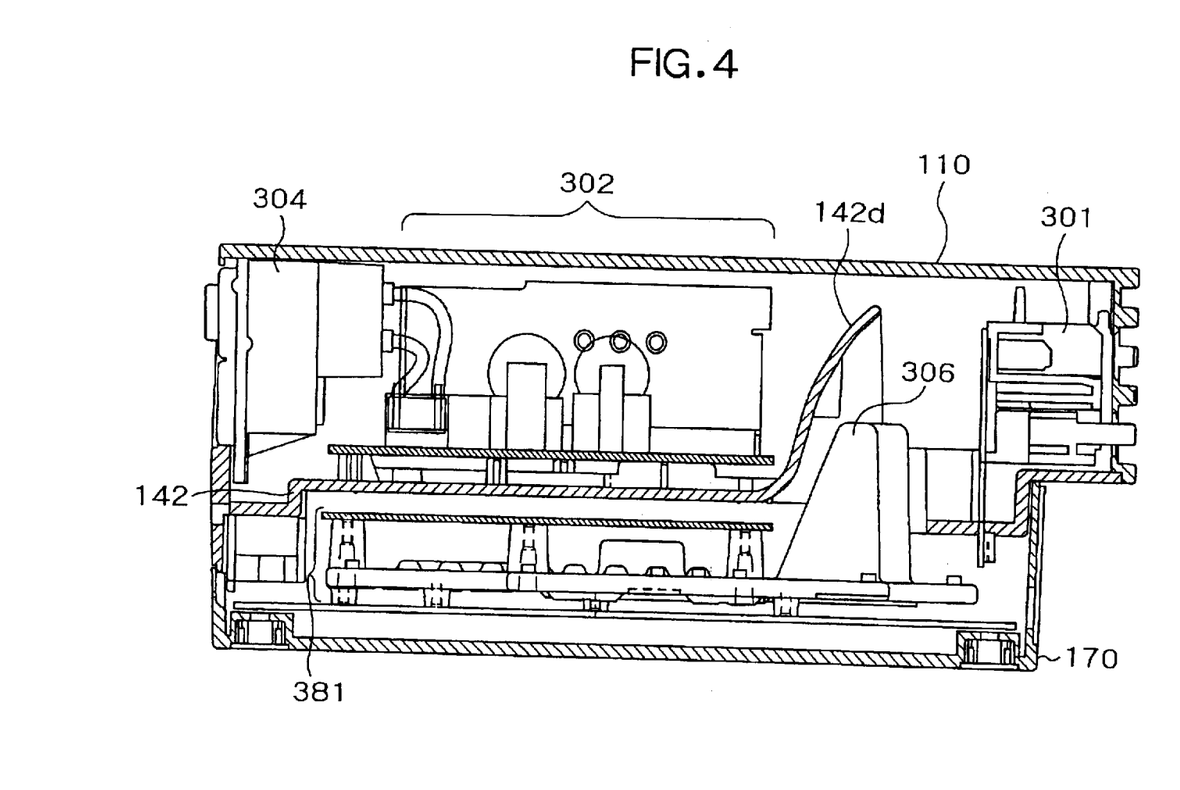
FIG. 4 is a cross-sectional view showing the entire construction of the entertainment apparatus in one embodiment of the present invention.
Figure 5:
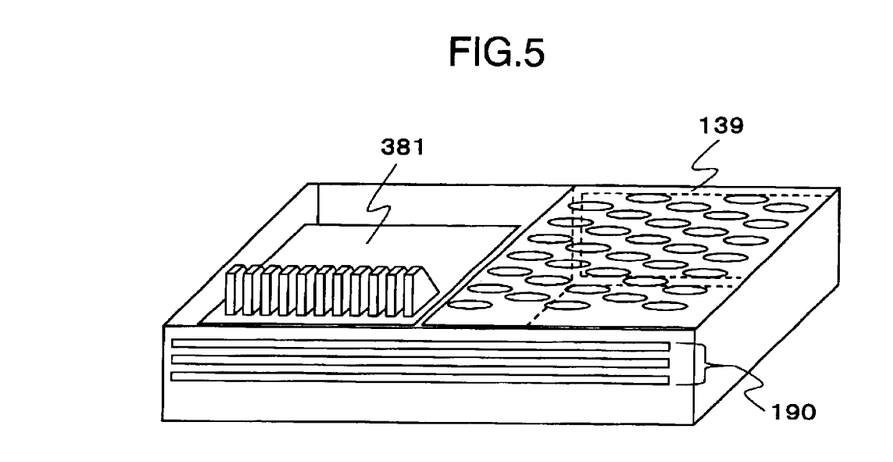
FIG. 5 is a perspective view showing a state in which an intermediate plate is removed from the box body 100 of the entertainment apparatus in one embodiment of the present invention.

As shown in FIG. 4, a main board 381 having a central processing unit 401 mounted thereon is arranged in the lower box body 170. Further, as shown in FIG. 5, a storing case 391 of the external memory device of the attaching-detaching type and a ventilation port 190 are arranged in the lower box body 170 together with the main board 381.

Figure 6:
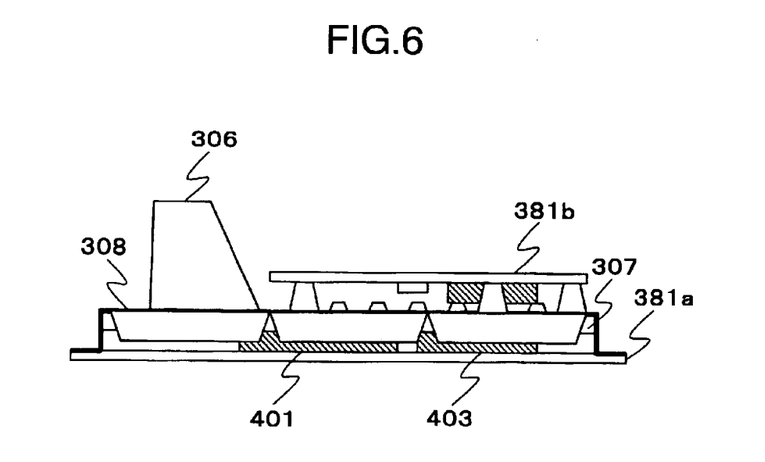
FIG. 6 is a side view of a main board 381.

As shown in FIG. 6, the main board 381 has a two-layered structure constituted of a main substrate 381a and a substrate 381b for power. A heat sink 307 integrated with the radiation fin 306 and a shield 308 formed of a metallic plate are arranged between the two substrates. Required circuits can be efficiently stored in a limited space by forming the above two-layer structure in which the heat sink and the shield are sandwiched between the substrates.

Figure 7:
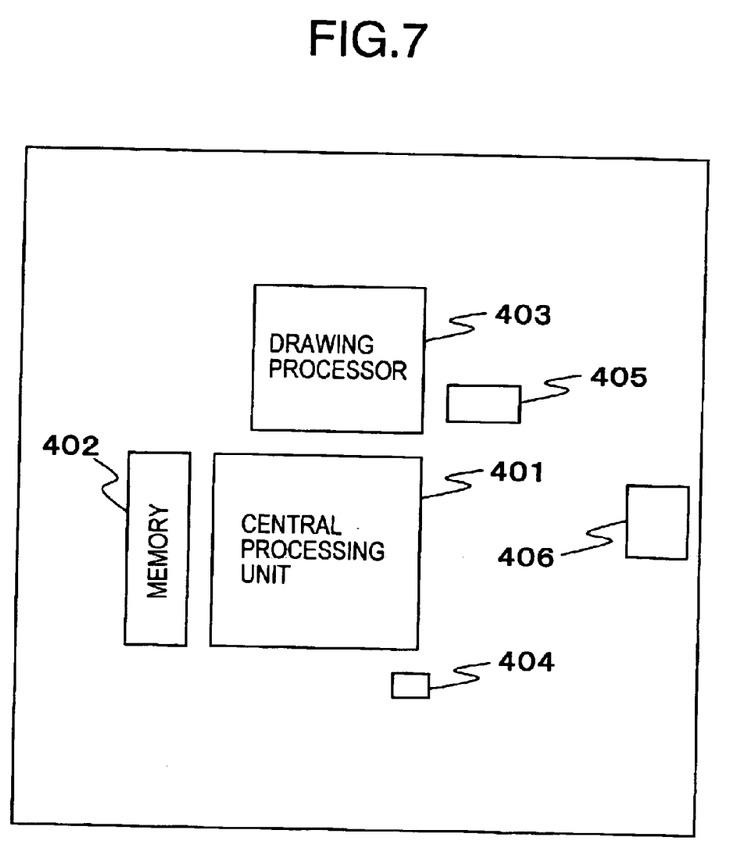
FIG. 7 is a schematic view of layout of main parts of a main substrate 381*a*.

As shown in FIG. 7, the central processing unit 401, a main memory device 402 and a drawing processor 403 are arranged as main parts in the main substrate 381a. A temperature sensor 404 is also arranged in the vicinity of the central processing unit 401. Further, a connector portion 405 to be used for electric connection with the power substrate 381b and a signal line cable 406 to work as a signal path of data when the external memory device is mounted are further arranged on the main substrate 381a.

Heat is generated by operation of the central processing unit 401, etc. arranged on the main substrate 381a. This heat is conducted to the heat sink 307 and is further conducted to the radiation fin 306. The air taken-in from the ventilation port 190 passes between respective fins of the radiation fin 306 when the air flows toward the cooling fan 305, whereby the air absorbs heat from the radiation fin 306. The air is exhausted from the cooling fan 305 to the exterior.

Figure 8:
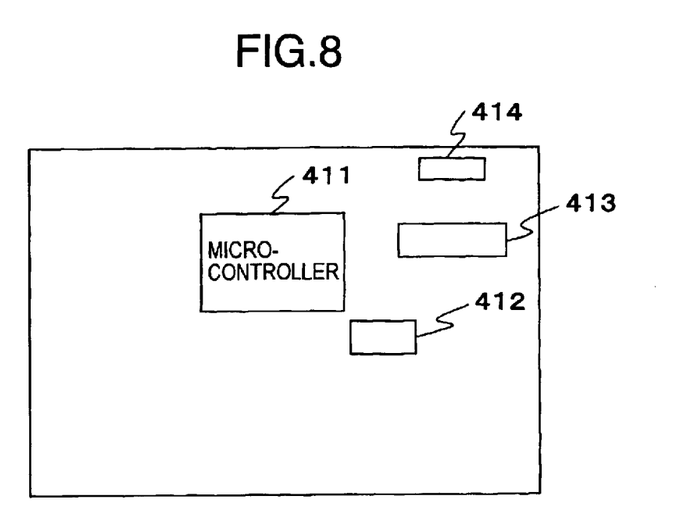
FIG. 8 is a schematic view of layout of main parts of a power substrate 381*b*.

As shown in FIG. 8, the power substrate 381b is provided with a microcontroller 411 for controlling a voltage supplied to each device within the entertainment apparatus, a connector portion 412 to be used for electric connection with the main substrate 381a, an external memory device power line 413 for supplying the voltage when the external memory device is mounted, and a cooling fan power line 414 for supplying the voltage to the cooling fan 305. The microcontroller 411 can determine whether or not the external memory device is mounted by monitoring a state of the power line 413 of the external memory device. Further, the microcontroller 411 can obtain a temperature measured by the temperature sensor 404 through the connector portion 405 of the main substrate 381a and the connector portion 412 of the power substrate 381b.

A general-purpose hard disk drive unit can be used as the external memory device to be mounted on this entertainment apparatus. The hard disk drive unit has a power connector portion and a data line connector portion. The external memory device power line 413 from the entertainment apparatus is connected to the power connector portion, and the signal line cable 406 is connected to the data line connector portion, so that the external memory device attains an operable state. The external memory device can then transmit and receive data in accordance with commands from the entertainment apparatus.

At this time, the external memory device can be stored to a storing case 391, and attains a fixing state by closing a cover, so that the external memory device is stored in the entertainment apparatus.

Control of the cooling fan in the entertainment apparatus of the above construction will be explained below.

Figure 9:
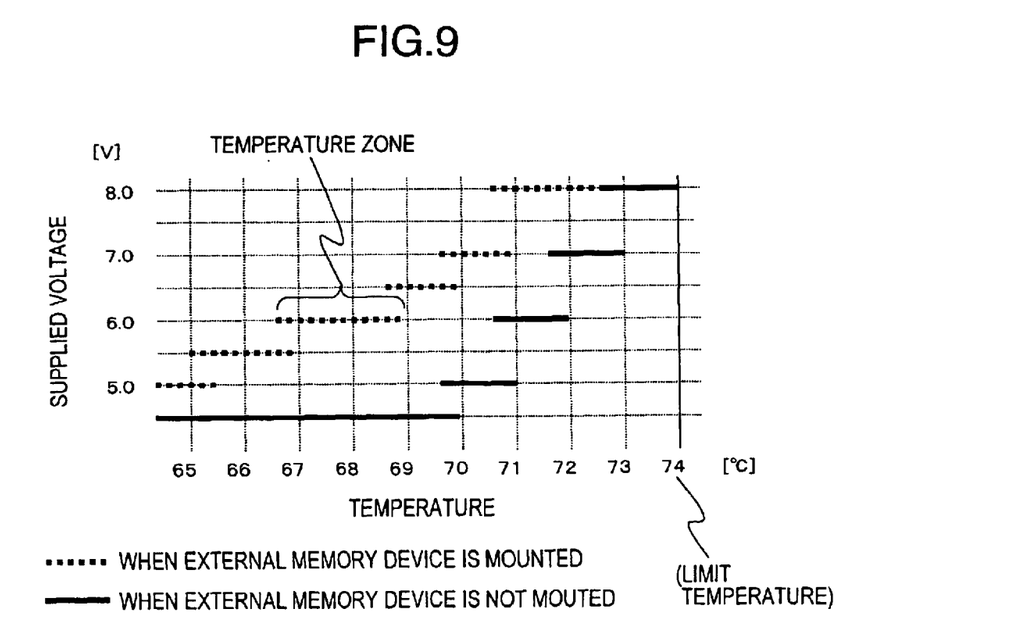
FIG. 9 is a schematic view of a correspondence table for fan control as one example of data for use in the control of a cooling fan.

In this embodiment, the microcontroller 411 has a correspondence table for the fan control as data to be used for the control of the cooling fan, for example, as schematically shown in FIG. 9. There may be employed a constitution in which the data to be used for the fan control is stored in the exterior of the microcontroller 411 and is referred to by the microcontroller 411. A format and values of the data to be used for the fan control are not limited to the example of this Figure. For example, a table format, a program format, etc., may be employed.

In the correspondence table for the fan control in this Figure, the axis of ordinate shows the value of a voltage supplied to the cooling fan 305, and the axis of abscissa shows the temperature measured by the temperature sensor 404 arranged in the vicinity of the central processing unit 401. This table shows the relationship between a temperature range and the supplied voltage when the external memory device is mounted (a 15 graph shown by a broken line) or not mounted (a graph shown by a solid line). The above temperature range applied with respect to a certain supplied voltage is called a temperature zone. A plurality of temperature zones are set for each of the time periods when the external memory device is mounted and not mounted.

Namely, when a certain temperature zone corresponding to the measured temperature is applied, and when the temperature rises and exceeds an upper limit of the present temperature zone, the present temperature zone is changed to a temperature zone for increasing the supplied voltage to the cooling fan 305, to increase the rotation number of the cooling fan 305. Conversely, when the temperature decreases to be lower than a lower limit of the present temperature zone, the present temperature zone is changed to a temperature zone for decreasing the supplied voltage to the cooling fan 305, to decrease the rotation number of the cooling fan 305. The voltage corresponding to the measured temperature can be accordingly supplied to the cooling fan 305.

As can be seen from this Figure, when the temperatures are at the same level, the microcontroller 411 supplies a higher voltage to the cooling fan 305 when the external memory device is mounted than when the external memory device is not mounted (provided that the case of supplying a highest voltage is excluded). That is because it is considered that heat sources and cooling objects are increased in number and the passage of a cooling air current becomes worse by mounting the external memory device. Further, that is because the influence of a noise generated by the cooling fan comes to be relatively low even when an increase in the rotation number makes the increased fan noise since the external memory device generates a noise.

Adjacent temperature zones are respectively set so as to overlap by 0.5° C., so that so-called hysteresis characteristics are provided. Thus, a frequent change from one temperature zone to another is prevented when the measured temperature is close to a boundary of each temperature zone.

Further, a limit value of the temperature (74° C. in the example of this Figure) is set, and when the measured temperature reaches the limit temperature, the microcontroller 411 stops supply of the voltage to the central processing unit 401 and the drawing processor 403.

Figure 10:
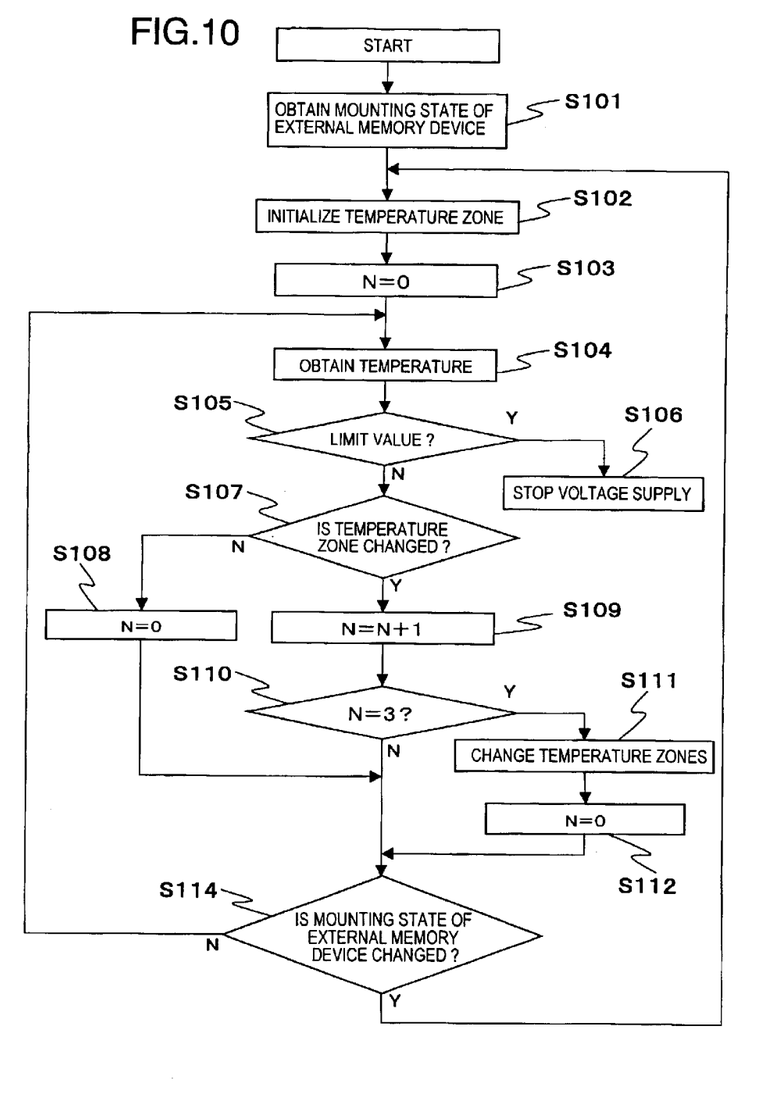
FIG. 10 is a flow chart for explaining a processing flow of a microcontroller 411.

The control of the cooling fan 305 in the above constitution will be explained. FIG. 10 is a flow chart for explaining processing by the microcontroller 411 in this case.

When the entertainment apparatus is started, the microcontroller 411 determines whether or not the external memory device is mounted from a state of the power line 413 of the external memory device. When the microcontroller 411 determines that the external memory device is mounted, the microcontroller 411 refers to the graph applied when the external memory device is mounted. When the microcontroller 411 determines that no external memory device is mounted, the microcontroller 411 refers to the graph applied when the external memory device is not mounted (S101).

Then, the microcontroller 411 initializes the temperature zone (S102). In this example, the temperature zone is set to a lowest range of the applied temperature in the initialization. The microcontroller 411 then supplies the cooling fan 305 with a voltage corresponding to this temperature zone.

The value of a variable N as a counter is then set to zero (S103). The above counter is used to count the number of times of the measured temperature serially exceeding the present temperature zone range. This aims at changing one temperature zone to another when the measured temperature exceeds the present temperature zone in serial three temperature measurements by taking account of a case where noises, etc., cause a large error on the measured temperature. Two variables of the counter may be also used on upper and lower limit sides of the temperature zone.

Then, the microcontroller 411 obtains the temperature measured by the temperature sensor 404 near the central processing unit 401 (S104).

The microcontroller 411 then refers to the correspondence table for the fan control, to determine whether or not the temperature reaches a limit value (S105). When the temperature reaches the limit value, the microcontroller 411 terminates the supply of the voltage to the central processing unit 401 and the drawing processor 403 (S106). When this temperature does not reach the limit value, the microcontroller 411 refers to the correspondence table for the fan control, to determine whether or not the obtained temperature is outside the range of the present temperature zone (S107).

When no obtained temperature is outside the range of the present temperature zone, i.e., when the obtained temperature is within the range of the present temperature zone, the value of the variable N is reset to zero (S108). The microcontroller 411 then determines whether the external memory device is attached or detached from the state of the power line 413 of the external memory device (S113).

When the obtained temperature is outside the range of the present temperature zone, the value of N is increased by one (S109). The microcontroller 411 then determines whether or not the value of N comes to be 3 (S110). If the value of N is not 3, the microcontroller 411 does not change the temperature zone and determines the attachment-detachment of the external memory device since it determines that no change of temperature zones serially takes three times (S113). When the value of N is 3, the temperature zone is changed to another since it determines that the obtained temperature comes to be outside the range of the present temperature zone serially three times (S111). In this case, when the obtained temperature is lower than the lower limit of the present temperature zone by referring to the correspondence table for the fan control, the microcontroller 411 changes the temperature zone to another temperature zone for increasing the voltage supplied to the cooling fan 305. When the obtained temperature is higher than the upper limit of the present temperature zone, the microcontroller 411 changes the temperature zone to another temperature zone for decreasing the voltage supplied to the cooling fan 305. Then, the value of the variable N is reset to zero (S112).

As described above, in the determination of attaching-detaching (S113) of the external memory device, the microcontroller 411 checks the state of the power line 413 of the external memory device, to determine whether or not there is a change in the attachment-detachment of the external memory device. As a result, when there is a change in the attachment-detachment, the process returns to the processing in S102, and the referred graph is changed to another, and the present temperature zone is set to that in an initial state when the external memory device is attached or detached. On the other hand, when there is no change in the attachment-detachment, the process returns to the processing in S104, and the temperature is obtained. The determination of attaching-detaching of the external memory device may be made separately from the processing shown in the flow chart of this Figure, and initialization processing (S102) of the temperature zone may be performed by interruption when there is a change in the attachment-detachment.

While there may be employed any cycle time of the above series of processings for obtaining the temperature and determining the change in the temperature zone, it can be set to, e.g., a predetermined period (250 m seconds, one second, etc.).

While the above example explains an embodiment in which the supplied voltage corresponds to the temperature zone, there may be employed an embodiment in which, for example, the temperature and the supplied voltage correspond to each other. This embodiment does not require the counter measurement or the determination of the change in the temperature zone, etc., so that the processing of the microcontroller 411 can be simplified.

In accordance with the present invention, therefore, therefore, it is possible to perform suitable control of the cooling fan depending upon the attaching and detaching states of the external memory device, etc. in the information processing device that permits internal mounting of the external memory device, etc.

What is claimed is:

1. A method of controlling a cooling fan in an information processing device that permits internal mounting of a relevant device, comprising the steps of:

obtaining an internal temperature of the information processing device;

obtaining an attaching-detaching state of the relevant device;

deciding a value relative to a rotation speed of the cooling fan, which is determined based on the obtained internal temperature and the attaching-detaching state of the relevant device; and controlling the rotation speed of the cooling fan on the basis of the decided value relative to the rotation speed of the cooling fan.

2. A method of controlling a cooling fan according to claim 1, wherein said step of deciding a value relative to a rotation speed of the cooling fan is executed by referring to data which show the relationship between the value relative to the rotation speed of the cooling fan and the internal temperature and are determined depending upon the attaching-detaching state of the relevant device, to decide a value relative to a rotation speed of the cooling fan which rotation speed corresponds to the obtained temperature.

3. An information processing device-readable recording medium for an information processing device that stores an executable program that permits internal mounting of a relevant device in cooperation with a cooling fan able to change its rotation speed, temperature obtaining means that obtains a temperature within the information processing device, attaching-detaching state obtaining means that obtains an attaching-detaching state of the relevant device, and control means that controls the rotation speed of the cooling fan, wherein the program causes said control means to execute the steps of:

processing for deciding a value relative to a rotation speed of the cooling fan, which is determined on the basis of the internal temperature obtained by said temperature obtaining means and the attaching-detaching state of the relevant device obtained by said attaching-detaching state obtaining means; and processing for controlling the rotation speed of the cooling fan based on the decided value relative to the rotation speed of the cooling fan.

4. The information processing device-readable recording medium and executable program according to claim 3, wherein said processing for deciding a value relative to a rotation speed of the cooling fan is executed by referring to data, which are determined depending upon the attaching-detaching state of the relevant device, showing the relationship between a value relative to a rotation speed of the cooling fan and the internal temperature, to decide a value relative to a rotation speed of the cooling fan, which corresponds to the obtained internal temperature.

* * * * *